US007318266B2

(12) United States Patent
Bergh

(10) Patent No.: US 7,318,266 B2
(45) Date of Patent: Jan. 15, 2008

(54) METHOD OF HANGING AN OBJECT

(75) Inventor: Anthony H. Bergh, Endeavor, WI (US)

(73) Assignee: Archery Shooters Systems, Inc., Endeavor, WI (US)

( * ) Notice: Subject to any disclaimer, the term of this patent is extended or adjusted under 35 U.S.C. 154(b) by 157 days.

(21) Appl. No.: 11/179,166

(22) Filed: Jul. 12, 2005

(65) Prior Publication Data

US 2006/0011789 A1 Jan. 19, 2006

Related U.S. Application Data

(62) Division of application No. 10/419,010, filed on Apr. 18, 2003, now abandoned.

(60) Provisional application No. 60/374,445, filed on Apr. 22, 2002.

(51) Int. Cl.
*B23P 11/00* (2006.01)

(52) U.S. Cl. ........................ 29/434; 248/156; 248/545; 40/607.06; 40/607.09

(58) Field of Classification Search .................. 29/434, 29/525.01, 275; 248/156, 545, 530, 533; 144/195.5; 173/91, 132; 40/607.06, 607.09
See application file for complete search history.

(56) References Cited

U.S. PATENT DOCUMENTS

| | | | | | |
|---|---|---|---|---|---|
| 3,076,557 | A | | 2/1963 | Husted et al. | |
| 3,143,817 | A | * | 8/1964 | Paulson | 40/607.06 |
| 3,584,821 | A | * | 6/1971 | Glebe | 248/156 |
| 3,926,393 | A | | 12/1975 | Tainsh | |
| 4,235,034 | A | | 11/1980 | Black | |
| 4,249,715 | A | | 2/1981 | Repp | |
| 4,326,352 | A | | 4/1982 | Barth | |
| 4,431,040 | A | * | 2/1984 | Friedrich et al. | 144/195.5 |
| 4,825,575 | A | | 5/1989 | Rethke | |
| 4,843,746 | A | | 7/1989 | DesNoyers et al. | |
| 4,866,873 | A | | 9/1989 | Van Valkenburg | |
| 4,910,901 | A | | 3/1990 | Boyar | |
| 5,010,710 | A | * | 4/1991 | Gray et al. | 52/741.14 |
| 5,042,591 | A | * | 8/1991 | Hull | 173/91 |
| 5,076,032 | A | * | 12/1991 | Lehman | 52/169.13 |
| 5,375,801 | A | | 12/1994 | Porter | |
| 5,699,864 | A | * | 12/1997 | Dvorak et al. | 173/91 |
| 5,806,508 | A | | 9/1998 | Stempien et al. | |
| 6,213,314 | B1 | | 4/2001 | Beemer | |
| 6,499,608 | B1 | | 12/2002 | Sterling et al. | |
| 6,732,985 | B1 | | 5/2004 | Cantrell | |

* cited by examiner

*Primary Examiner*—Jermie E. Cozart
(74) *Attorney, Agent, or Firm*—Ryan Kromholz and Manion S.C.

(57) ABSTRACT

A hammer hanger is useful for hanging objects off the ground. The hammer hanger includes a Slide hammer tube that impacts a stake to insert the stake into and remove it from the ground. The slide hammer comprises a slide hammer tube that is slidingly captured on the stake. A spade of the stake prevents the hammer hanger from tipping in soft or wet soil. One or more arms are pivotally held on the slide hammer tube for folding and unfolding. Objects are hangable on the unfolded arms. The arms may have hooks that are specially constructed to hang archery bows. The slide hammer may be one or more slide hammer tubes that are releasably lockable to each other for assembling and disassembling the tubes. A stop on the stake coats with the slide hammer tube to prevent the slide hammer tube from rotating on the stake.

10 Claims, 4 Drawing Sheets

METHOD OF HANGING AN OBJECT

RELATED APPLICATIONS

This application is a divisional of patent application Ser. No. 10/419,010, filed 18 Apr. 2003 now abandoned, which claims the benefit of provisional application Ser. No. 60/374,445, filed 22 Apr. 2002.

BACKGROUND OF THE INVENTION

1. Field of the Invention

This invention pertains to hanging objects off the ground, and more particularly to hanging apparatus that is insertable into and removable from the ground.

2. Description of the Prior Art

It is a very common practice to hold selected objects off the ground by means of posts or poles inserted into the ground. Clotheslines, telephone wires, and fences are but a tiny sample of the great variety of objects that are held above the ground by poles and/or posts.

Many poles and posts are intended to be permanently placed in the ground. Others, however, are intended only for temporary use. For example, real estate sales signs are often hung from a post on the property being advertised for sale. After the transaction associated with the property has been completed, the sign and post are removed for transporting to a different property.

In the past, it was an onerous chore to drive a post such as a real estate sign post into the ground. A person required a shovel or similar tool, which was difficult to use in compacted or rocky ground. It was a second chore to remove the post. That was especially true if the ground froze while the post was in place. Removing a post from frozen or otherwise hard ground risked damage to the tools as well as the post itself.

Another example of temporarily hanging objects off the ground concerns archery bows. During competition or at a practice site, an archer frequently sets his bow down between shots. Since bows are expensive, archers desire to protect them from moisture and dirt. That was difficult to do when laying them on the ground. Accordingly, it is desirable to hang the bows from a support rather than lay them on the ground. However, no suitable bow hanger exists for archery use.

In the past, it was an onerous chore to drive a post such as a real estate sign post into the ground. A person required a shovel or similar tool, which was difficult to use in compacted or rocky ground. It was a second chore to remove the post. That was especially true if the ground froze while the post was in place. Removing a post from frozen or otherwise hard ground risked damage to the tools as well as the post itself.

U.S. Pat. No. 4,866,873 shows a fishing pole holder that includes a stake drivable into the ground. A slide hammer on the holder aids in the inserting and removing process. The holder of the U.S. Pat. No. 4,866,873 is unsuitable for holding such large items as signs and archery bows.

Thus, a need exists for improvements in supports that temporarily hold objects off the ground.

SUMMARY OF THE INVENTION

In accordance with the present invention, a hammer hanger is provided that is easily erected into and taken down from the ground. This is accomplished by apparatus that includes a stake and a slide hammer.

The stake is comprised of a rod having a flange between the ends of the rod. A stop is fixed to the first rod end. According to one aspect of the invention, the stake stop has a rectangular outer periphery. Preferably, a spade is secured to the rod between its second end and the flange.

The slide hammer comprises a tube that is captured on and slides over the stake. The slide hammer tube has an inner periphery that matches the size and shape of the stake stop outer periphery. There is a washer on the tube lower end. The slide hammer tube is slideable in a first direction until the washer strikes the flange on the stake. The slide hammer tube is slideable in the opposite direction until the washer strikes the stop on the stake. The slide hammer tube may be of any practical length. According to one embodiment of the invention, the slide hammer tube is approximately four feet long.

At the upper end of the slide hammer tube is an arm. The arm is constructed to hold any of a number of different objects. According to one aspect of the invention, the arm is constructed as a hanger for signs. In another embodiment, the arm is equipped with hooks for hanging archery bows.

It is a feature of the invention that the arm is foldable on the slide hammer tube. When the arm is folded, it lies alongside the slide hammer tube and thus occupies a minimum of space. When the arm is unfolded, it is generally perpendicular to the slide hammer tube in a position for hanging a sign, archery bow, or other object.

The hammer hanger is used by placing the stake rod first end on the ground at the desired location. The slide hammer tube is oriented to be substantially vertical. The slide hammer tube is slid in the upward direction until the washer on its lower end approaches the stop on the stake rod. Then the slide hammer tube is slid rapidly such that the washer strikes the stake flange with an impact that drives the stake rod into the ground. The process is repeated until the stake rod and spade are at the desired depth in the ground. Then the arm is unfolded to hang the selected object off the ground. The spade on the stake prevents the hammer hanger from tipping over in soft ground. The rectangular shapes of the stake stop outer periphery and the slide hammer tube inner periphery prevent the slide hammer tube from rotating on the stake. If the stake stop and slide hammer tube have circular outer and inner peripheries, respectively, a locking device may be used to prevent the slide hammer tube from rotating on the stake.

When it is desired to remove the hammer hanger from the ground, the slide hammer tube is slid very rapidly away from the stake flange until the washer strikes the stop on the stake. The impact causes the stake to move upwardly out of the ground. The process is repeated until the stake can be pulled from the ground. The arm is folded for transporting the hammer hanger to a different site.

In a modified embodiment, the slide hammer is constructed with two tubes. A bottom slide hammer tube has a washer at its lower end, and it is slidingly captured on a stake. A top slide hammer tube has an arm at its upper end and a pilot at its lower end. The pilot is assembleable to and disassembleable from the bottom slide hammer tube. In that manner, different top slide hammer tubes with different arms can be used interchangeably with a single bottom slide hammer tube and stake.

The method and apparatus of the invention, using one or more slide hammer tubes slideable on a stake, thus makes it an easy task to erect and take down the hammer hanger. Different arms can be used for hanging different objects, even though only a single stake is required.

Other advantages, benefits, and features of the present invention will become apparent to those skilled in the art upon reading the detailed description of the invention.

DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
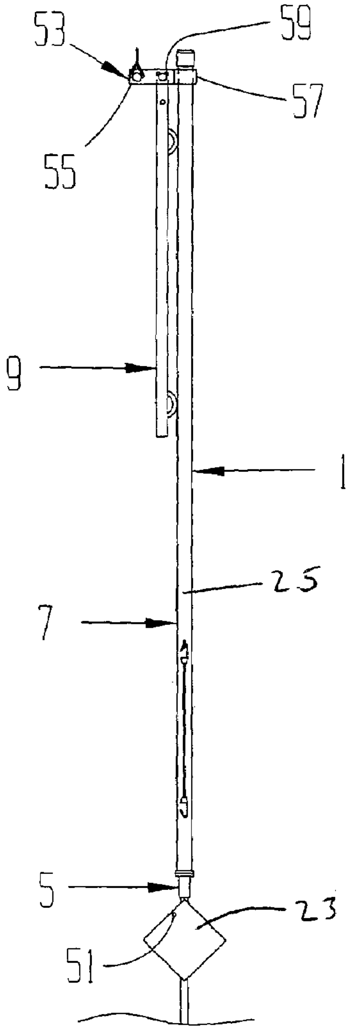
FIG. 1 is front view of the hammer hanger ready to be erected in the ground.
Figure 2:
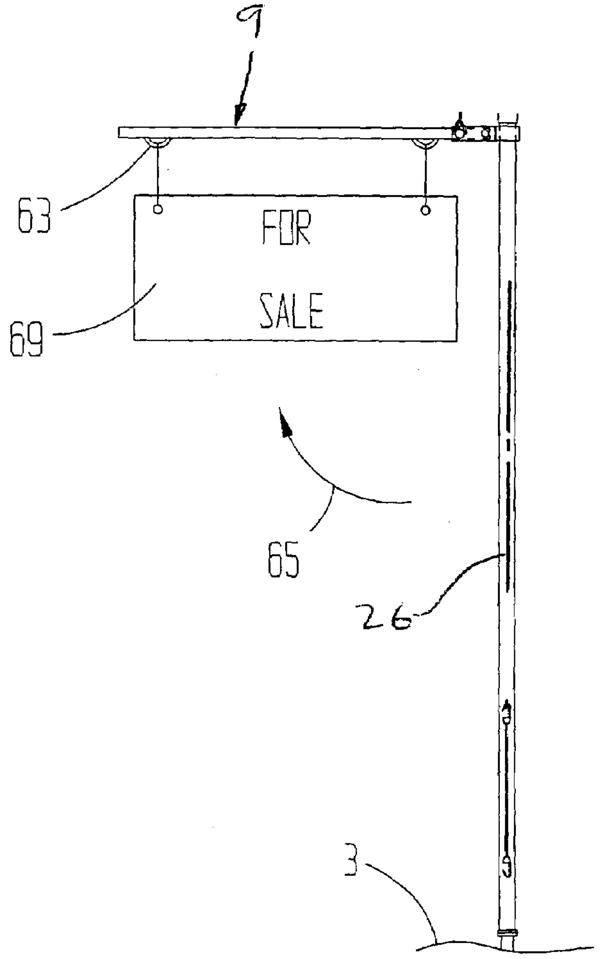
FIG. 2 is a view of the erected hammer hanger.

Referring to FIGS. 1 and 2, a hammer hanger 1 is illustrated that includes the present invention. The hammer hanger 1 is particularly useful for holding selected objects off the ground 3. However, it will be understood that the invention is not limited to outdoor applications.

The hammer hanger 1 is comprised of a stake 5 that is insertable into and removable from the ground 3 by means of a slide hammer 7. An arm 9 on the slide hammer 7 is foldable to lie alongside the slide hammer as shown in FIG. 1. The arm 9 is also unfoldable so as to be generally perpendicular to the slide hammer as shown in FIG. 2. It is preferred that the hammer hanger be made of steel components.

Figure 3:
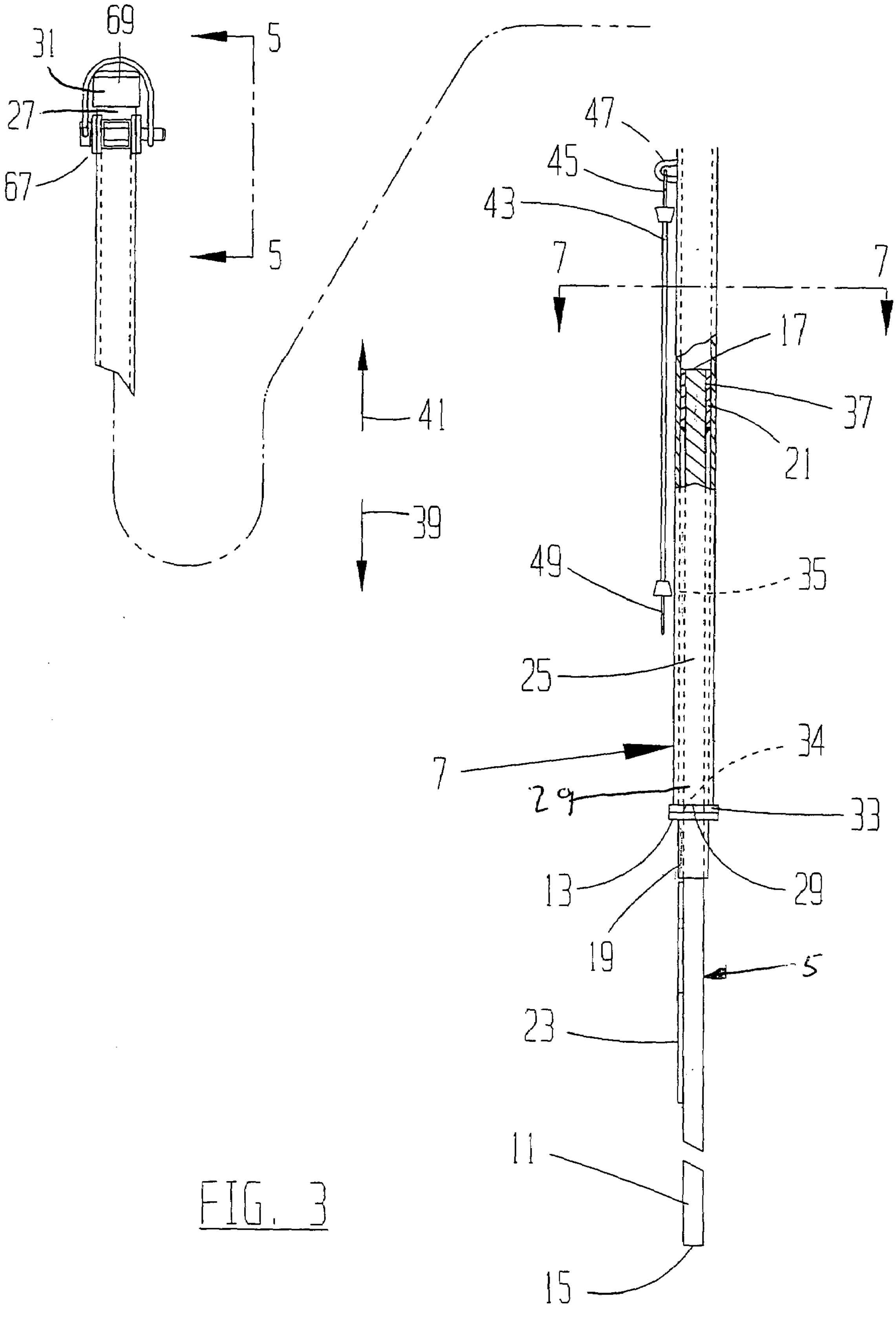
FIG. 3 is a partially broken side view on an enlarged scale of the hammer hanger.
Figure 7:
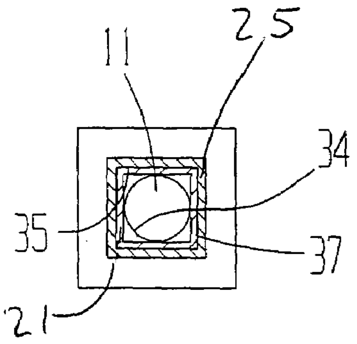
FIG. 7 is a cross-sectional view on an enlarged scale taken along line 7-7 of FIG. 3.

Looking also at FIGS. 3 and 7, the stake 5 is made of a rod 11. A flange 13 is welded to the rod 11 approximately mid-way between the rod bottom end 15 and top end 17. As illustrated, the flange 13 is part of a collar 19 surrounding and welded to the rod. At the top end 17 of the rod is a stop 21, which preferably is a short tube that fits over and is welded to the stake rod. According to one aspect of the invention, the stop 21 has a rectangular outer periphery 37. However, a round outer periphery is also acceptable. Close to the collar 19 is a spade 23. The spade 23 is depicted as generally diamond in shape, but other shapes are also within the scope of the invention.

The slide hammer 7 includes a tube 25 having a longitudinal axis 26 and upper and lower ends 27 and 29, respectively. A rubber cap 31 may be pressed over the slide hammer tube upper end 27. Fixed on the slide hammer tube lower end 29 is a washer 33. The washer 33 has an inner diameter 34 that is sized to slide easily over the stake rod 11. The slide hammer tube 25 has an inner periphery 35 sized and shaped to slide easily over the outer periphery 37 of the stake stop 21. The inner diameter 34 of the washer 33 is smaller than the periphery 37 of the stake stop. Consequently, the slide hammer is captured on the stake 5, but the slide hammer is free to slide on the stake. Specifically, the slide hammer is slideable in the direction of arrow 39 until the washer 33 strikes the flange 13 on the stake. The slide hammer is slideable in the direction of arrow 41 until the washer 33 strikes the stake stop 21. To hold the hammer hanger 1 with the washer 33 and flange in contact, the present invention further includes a connector such as a shock cord 43. One end of the connector 43 has a hook 45 that engages a ring 47 on the slide hammer tube 25. The other end of the connector has a second hook 49 that is engageable with a hole 51 in the stake spade 23.

Figure 5:
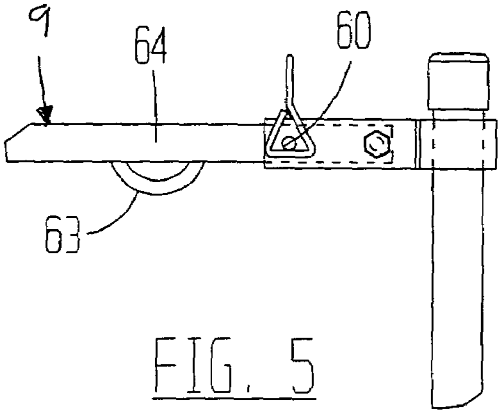
FIG. 5 is a view taken along line 5-5 of FIG. 3.

To hold the arm 9 to the slide hammer tube 25, a clamp 53 is used. Also see FIGS. 5 and 6. In the illustrated construction, the clamp 53 is a channel having spaced parallel sides 55 with a bight 57 that wraps around the slide hammer tube. A fastener 59 passing through the clamp sides 55 enables the clamp to firmly grip the slide hammer tube. There is a pair of aligned holes 60 in the clamp sides near their distal ends 62.

The particular arm 9 illustrated is a rectangular tube 64 having aligned holes that receive the clamp fastener 59. The arm tube 64 also has aligned second holes 61, and a pair of eyes 63.

Figure 6:
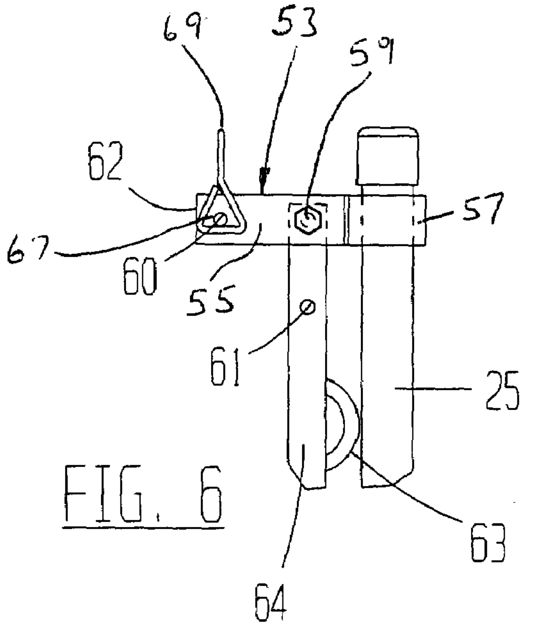
FIG. 6 is a view similar to FIG. 5, but showing the arm in the folded position.

In FIGS. 1 and 6, the arm 9 is shown in a folded position whereat it lies alongside the slide hammer tube 25. To unfold the arm, it is pivoted in the direction of arrow 65 until the arm holes 61 align with the clamp holes 60. Then a pin 67, which may be a safety pin with a conventional spring loop 69, is inserted through the holes 60 and 61 to retain the arm in the unfolded position, FIGS. 2 and 5. when the arm is in the unfolded position, a sign 69 or similar object can be hung from the eyes 63.

In FIGS. 1-3, the slide hammer 7 has a single long slide hammer tube 25. A preferred dimension for the slide hammer tube 25 is approximately 57 inches. Other preferred dimensions include lengths of approximately 27 inches for the stake rod 11, and approximately 19 inches for the arm 9.

Figure 4:
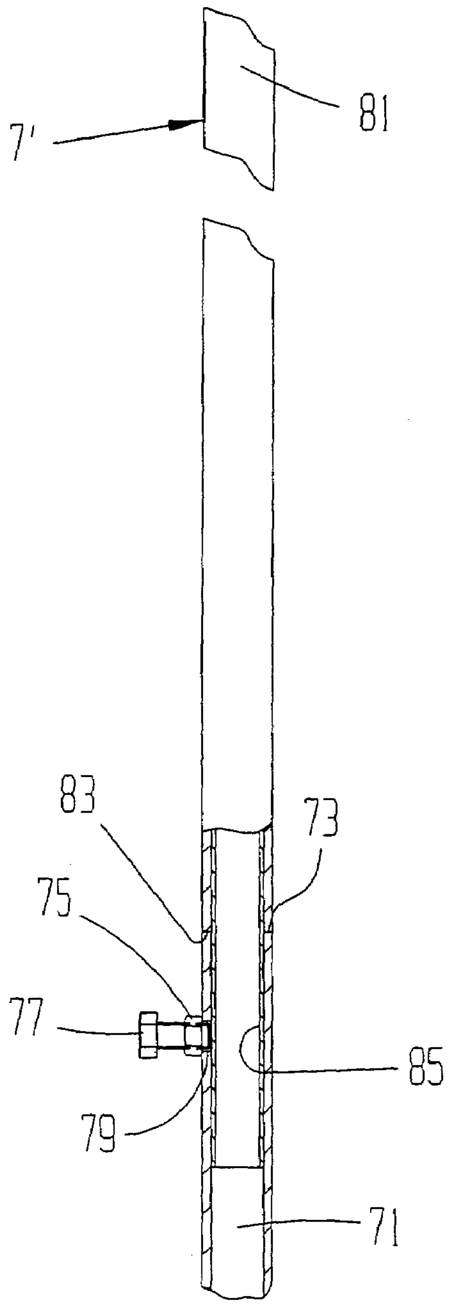
FIG. 4 is a broken view of a two-piece slide hammer according to the present invention.

In FIG. 4, an alternate slide hammer 7' is made with to slide hammer tubes. A bottom slide hammer tube 71 is constructed with a ring such as the ring 47 and a washer such as the washer 33 of the slide hammer tube 25 described previously. The bottom slide hammer tube 71 is captured on and is slideable along a stake 5 in the same way as the slide hammer tube 25. The bottom slide hammer tube 71 has an upper end 73 near which is welded a nut 75. A screw 77 is threaded to the nut 75 and passes through a hole 79 in the bottom slide hammer tube wall.

The slide hammer 7' also has a top slide hammer tube 81 having a lower end 83. A pilot tube 85 is welded to the interior of the top slide hammer tube 81 and assembles into the interior of the bottom slide hammer tube 71 until the ends 73 and 83 abut. Then the screw 77 is tightened to lock the two slide hammer tubes to each other. In that manner, different top slide hammer tubes can be used with a single bottom slide hammer tube and stake 5.

In use, the arm 9 is usually folded and the cord hook 49 engages the spade hole 51 when transporting the hammer hanger 1 to the desired location. If the slide hammer 7' with the two slide hammer tubes 71 and 81 is used, the two tubes may be disassembled from each other for transporting. The hammer hanger is erected by placing the stake rod end 15 on the ground 3 and orienting the slide hammer tube to be vertical. The cord hook 49 is disengaged from the spade hole 51. The slide hammer tube 25 or 71 is slid upwardly in the direction of arrow 41 until the washer 33 approaches the stop 21. Then the slide hammer tube is slid rapidly downwardly in the direction of arrow 39 until the washer strikes the flange 13. That action produces an impact on the stake 5 that drives the rod 11 into the ground. The process is repeated as often as necessary until the spade 23 is fully inserted into the ground. If used, the top slide hammer tube 81 is assembled to the bottom slide hammer tube 71. The arm 9 is unfolded and retained in place with the pin 67. The spade prevents the hammer hanger from tipping over in soft or wet soil and also prevents the stake from rotating in the ground about the rod longitudinal axis. The coaction between the rectangular slide hammer tube 25 or 71 and the rectangular stake stop 21 prevents the slide hammer from rotating about its longitudinal axis 26 on the stake. If a stake stop with a round outer periphery and a slide hammer tube with a round inner periphery are used, the slide hammer preferably includes a locking device that prevents the slide hammer from rotating about its longitudinal axis on the stake. A suitable locking device is a nut and screw similar to the nut 75 and screw 77 described above. The nut is welded to the slide hammer tube near its lower end. The screw threads to the nut and passes through a hole in the slide hammer tube to lock against the rod 11. In that manner, the hammer hanger having either a round or rectangular stop and slide hammer tube remains in place after it is erected until it is taken down.

To take down the hammer hanger 1, the sign 69 other object removed from the eyes 63. The pin 67 is removed from the clamp holes 60 and arm holes 61, and the arm 9 is folded against the slide hammer tube 25. If the hammer hanger has the two-piece slide hammer 7', the screw 77 is loosened to unlock the pilot 85 of the top slide hammer tube 81 from the bottom slide hammer tube 71, and the top tube is disassembled from the bottom tube. After disengaging the cord hook 49 from the spade hole 51, the slide hammer 7 is slid rapidly in the direction of arrow 41 until the washer 33 strikes the stop 21. The impact thus produced tends to remove the stake 5 and spade 23 from the ground 3. Depending on the condition of the ground, it make take more than one cycle of striking the stake stop with the slide hammer tube before the stake is removed from the ground. Eventually, the stake is removed, and the hammer hanger is ready for transporting to another site.

Figure 8:
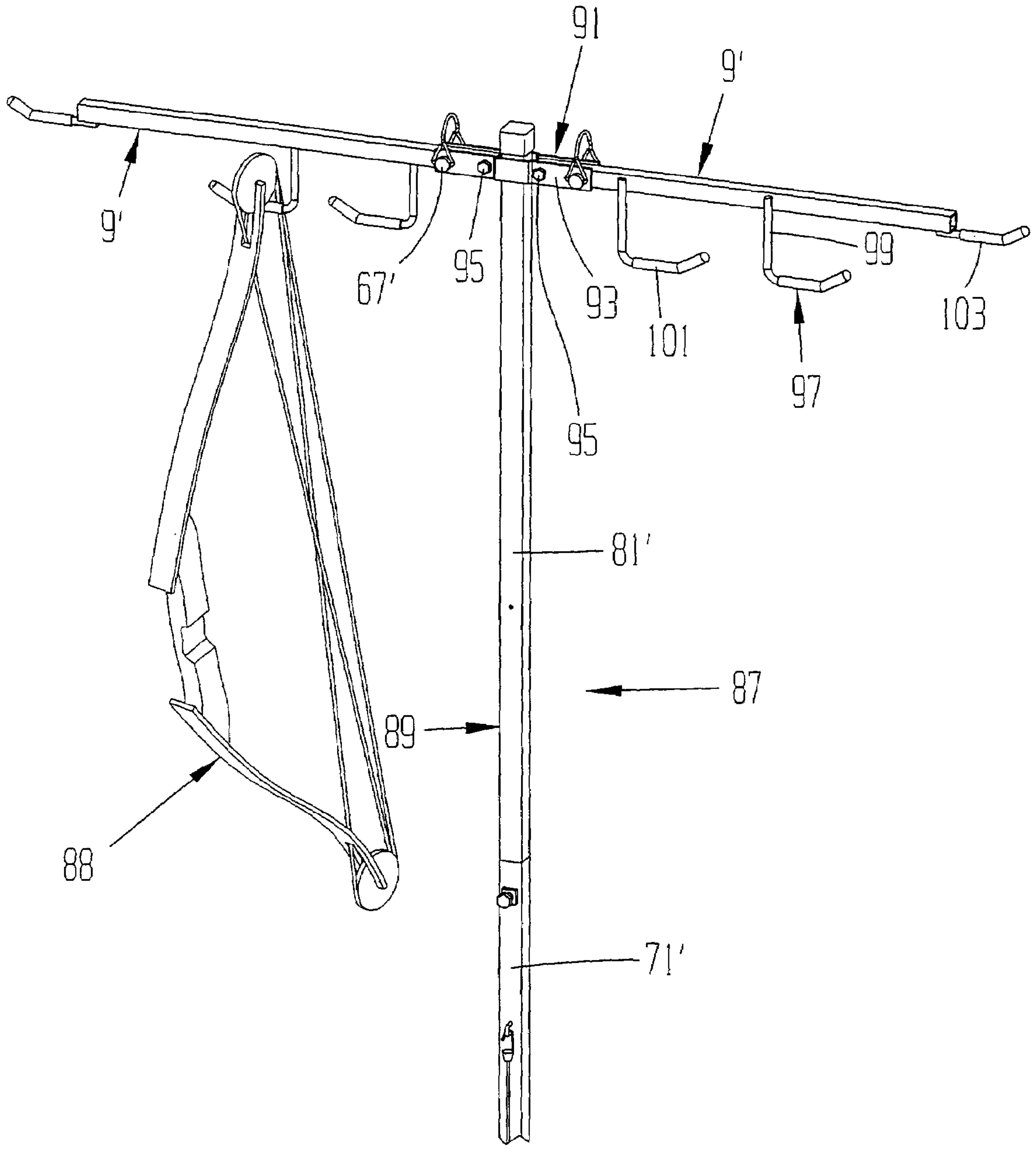
FIG. 8 is a perspective view of a modified embodiment of the invention.

Further in accordance with the present invention, the hammer hanger is eminently suitable for hanging different types of objects off the ground 3. Turning to FIG. 8, a hammer hanger 87 is depicted that is used with for hanging archery bows, typically represented at reference numeral 88, off the ground. The hammer hanger 87 is shown with a slide hammer 89 having a bottom slide hammer tube 71' and a top slide hammer tube 81'. However, it will be appreciated that a single slide hammer tube such as the slide hammer tube 25 described previously is also acceptable for the slide hammer 87. On the top slide hammer tube 81' is a clamp 91. According to one aspect of the invention, the clamp 91 is comprised of a pair of parallel plates 93 held together by a pair of fasteners 95. The plates 93 extend in Opposite directions from the top slide hammer tube. Between the plates on each side of the top slide hanger tube is an arm 9'. The arms 9' are held to the clamp by the fasteners 95. Safety pins 67' are used to retain the arms 9' in the unfolded position as shown in FIG. 8. The arms are foldable alongside the slide hammer tube 81' by removing the pins 67 as was described previously in connection with the hammer hanger 1 of FIGS. 1-7.

On each arm 9' are a number of hooks. As illustrated, there are three hooks on each arm, but that number is not critical to the invention. Two of the hooks 97 have shanks 99 that are generally perpendicular to the arm and supports 101 that are generally parallel to the arm. Another hook 103 at the free end of each arm is generally parallel to the arm for the hook full length. It will be appreciated, of course, that the construction of the hooks 97 and 103 may vary without departing from the scope of the invention. The hammer hanger 87 is erected at the site of archery practice fields and competition events to hang the expensive bows 88 off the ground between shots.

The illustrated hammer hanger 87 has two arms 9' on opposite sides of the top slide hammer tube 81'. However, if desired, only one arm 9' and associated hooks 97 and 103, together with the clamp 53 of FIGS. 1, 2, 5, and 6, may be used instead of the two arms 9' and clamp 91 shown.

In summary, the results and advantages of hanging various objects off the ground 3 can now be more fully realized. The hammer hanger of the invention provides both easy erection and take down of the hammer hanger as well as convenient transportation between sites. This desirable result comes from using the combined functions of the slide hammer and the arms. The slide hammer impacts the stake 5 in the directions 39 and 41 to both erect and remove, respectively, the hammer hanger. The spade 23 maintains the hammer hanger upright in soft or wet soil. The rectangular cross-sections of the slide hammer tube and stake stop 21 prevent the slide hammer tube from rotating on the stake. The arms are foldable for easy transportation. Different kinds of holding elements can be fixed to the arms for holding different kinds of objects, such as a sign 69 or archery bows 88. The slide hammer tube may be in more than one piece, thereby even further enhancing the versatility and usefulness of the invention.

It will also be recognized that in addition to the superior performance of the invention, its construction is such as to be of modest cost in relation to the benefits it provides. In fact, the hammer hanger will quickly pay for itself due to increased productivity related to hanging signs and previously unavailable protection for archery bows.

Thus, it is apparent that there has been provided, in accordance with the invention, a hammer hanger that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim:

1. A method of hanging an object off the ground comprising the steps of:

a. providing a stake having first and second ends;

b. capturing a slide hammer that defines a longitudinal axis on the stake;

c. holding at least one arm on the slide hammer, wherein the step of holding the at least one arm on the slide hammer comprises the step of folding the at least one arm to a folded position whereat the at least one arm is alongside the slide hammer, and unfolding the at least one arm to an unfolded position whereat the at least one arm is generally perpendicular to the slide hammer;

d. placing the stake first end on the ground;

e. impacting the stake in a first direction with the slide hammer and inserting the stake first end into the ground; and f. hanging a selected object from the arm.

2. The method of claim 1 wherein a. the step of providing a stake comprises the step of providing a stake with a spade; and b. the step of inserting the stake first end into the ground comprises the step of inserting the spade into the ground.

3. The method of claim 1 comprising the further step of releasably retaining the at least one arm in the unfolded position.

4. The method of claim 1 comprising the further steps of impacting the stake with the slide hammer in a second direction, and removing the stake from the ground.

5. The method of claim 1 comprising the further step of preventing the slide hammer from rotating about the longitudinal axis thereof on the stake.

6. A method of hanging an object off the ground comprising the steps of:

a. providing a stake having first and second ends;

b. capturing a slide hammer that defines a longitudinal axis on the stake;

c. holding at least one arm on the slide hammer, wherein the step of holding the at least one arm to the slide hammer comprises the step of holding two arms to the slide hammer;

d. placing the stake first end on the ground;

e. impacting the stake in a first direction with the slide hammer and inserting the stake first end into the ground; and f. hanging a selected object from the arm.

7. The method of claim 6 comprising the further steps of folding the arms to respective folded positions whereat the arms are generally alongside the slide hammer, and unfolding the arms to respective unfolded positions whereat the arms are generally perpendicular to the slide hammer.

8. A method of hanging an object off the ground comprising the steps of:

a. providing a stake having first and second ends;

b. capturing a slide hammer that defines a longitudinal axis on the stake. wherein the step of capturing a slide hammer on the stake comprises the steps of:

i. providing a first slide hammer tube having first and second ends;

ii. capturing the first end of the first slide hammer tube on the stake;

iii. providing a second slide hammer tube having first and second ends; and iv. releasably locking the first end of the second slide hammer tube to the second end of the first slide hammer tube;

c. holding at least one arm on the slide hammer, wherein the step of holding the at least one arm on the slide hammer comprises the step of holding the at least one arm on the second end of the second slide hammer tube;

d. placing the stake first end on the ground;

e. impacting the stake in a first direction with the slide hammer and inserting the stake first end into the ground; and f. hanging a selected object from the arm.

9. The method of claim 8 wherein the step of releasably locking the first end of the second slide hammer tube to the second end of the first slide hammer tube comprises the steps of providing a pilot on a selected one of the first and second slide hammer tubes, and assembling the pilot to the other of the selected one of the first and second slide hammer tubes.

10. The method of claim 8 wherein:

a. the step of holding at least one arm comprises the step of providing the at least one arm with at least one hook; and b. the step of hanging a selected object comprises the step of hanging at least one archery bow from the at least one hook.

* * * * *

UNITED STATES PATENT AND TRADEMARK OFFICE

CERTIFICATE OF CORRECTION

PATENT NO. : 7,318,266 B2
APPLICATION NO. : 11/179166
DATED : January 15, 2008
INVENTOR(S) : Anthony H. Bergh It is certified that error appears in the above-identified patent and that said Letters Patent is hereby corrected as shown below:

Title Page Item (57) Abstract, line 13, after “stake” delete “coats” and substitute -- coacts --

Signed and Sealed this

Twenty-fourth Day of November, 2009

David J. Kappos

David J. Kappos
*Director of the United States Patent and Trademark Office*